United States Patent
Kamalian (10) Patent No.: US 7,497,455 B2
(45) Date of Patent: Mar. 3, 2009

(54) CARBON FIBER MOTORCYCLE FRAME

(75) Inventor: Michael Kamalian, 1435 Field Park Cir., Bldg. 100, Marietta, GA (US) 30062

(73) Assignee: Michael Kamalian, Marietta, GA (US)

( * ) Notice: Subject to any disclaimer, the term of this patent is extended or adjusted under 35 U.S.C. 154(b) by 311 days.

(21) Appl. No.: 11/343,274

(22) Filed: Jan. 30, 2006

(65) Prior Publication Data

US 2006/0290094 A1 Dec. 28, 2006

Related U.S. Application Data

(60) Provisional application No. 60/648,365, filed on Jan. 28, 2005.

(51) Int. Cl.
B62K 11/00 (2006.01)

(52) U.S. Cl. .......... 280/281.1; 280/288.3; 280/274

(58) Field of Classification Search .......... 280/274, 280/288.1, 288.3
See application file for complete search history.

(56) References Cited

U.S. PATENT DOCUMENTS

| | | | |
|---|---|---|---|
| 4,010,812 A | 3/1977 | Bothwell | 280/284 |
| 4,022,484 A | 5/1977 | Davis | 280/284 |
| 4,047,730 A | 9/1977 | Panoz | 180/312 |
| 4,070,020 A | 1/1978 | Dano | 473/536 |
| 4,070,021 A | 1/1978 | Cecka et al. | 473/536 |
| 4,087,109 A | 5/1978 | Davis | 280/284 |
| 4,124,670 A | 11/1978 | Cecka et al. | 264/45.3 |
| 4,170,272 A | 10/1979 | Smolinski | 180/227 |
| 4,189,167 A * | 2/1980 | Dubois | 280/279 |
| 4,461,489 A | 7/1984 | Tsukiji | 280/5 A |
| D275,470 S | 9/1984 | Koizumi | D12/110 |
| 4,527,839 A | 7/1985 | Fujitaka | 301/999.999 |
| 4,662,645 A * | 5/1987 | McMurtrey | 280/279 |
| 4,684,144 A | 8/1987 | Tanaka | 280/999.999 |
| 4,696,363 A | 9/1987 | Enda | 180/219 |
| 4,805,716 A | 2/1989 | Tsunoda | 180/219 |
| 4,852,678 A | 8/1989 | Yamaguchi | 180/219 |
| 4,887,687 A | 12/1989 | Asai | 180/219 |
| 4,887,828 A * | 12/1989 | Chonan | 280/280 |
| 4,902,458 A * | 2/1990 | Trimble | 264/46.6 |
| 4,911,474 A | 3/1990 | Fukuda | 280/835 |
| 4,951,774 A | 8/1990 | Buell | 180/225 |
| 4,982,975 A * | 1/1991 | Trimble | 280/281.1 |
| 5,261,504 A | 11/1993 | Katasura | 180/219 |
| 5,269,551 A * | 12/1993 | Martin et al. | 280/281.1 |

(Continued)

OTHER PUBLICATIONS

Hanna, "John Kenton Britten and His V1000," Motor Cyclist, Issue 1294, Jan. 2005, pp. 73-85.

(Continued)

Primary Examiner—Paul N Dickson
Assistant Examiner—Michael R Stabley
(74) Attorney, Agent, or Firm—Ballard Spahr Andrews & Ingersoll, LLP (57) ABSTRACT

Disclosed are motorcycle frame assemblies comprised of carbon fibers. Methods of making the disclosed motorcycle frame assemblies are also disclosed. In one aspect, the frame assembly of the motorcycle comprises a structural member that includes an engine compartment member, which is adapted to receive an engine on a portion of an inner surface of an opening defined within the engine compartment member. In one further aspect, the structural member comprises a carbon fiber material.

41 Claims, 9 Drawing Sheets

U.S. PATENT DOCUMENTS

| | | | | |
|---|---|---|---|---|
| 5,284,221 | A | 2/1994 | Warne | 180/219 |
| 5,344,219 | A | 9/1994 | Adrian | 301/64.1 |
| 5,375,677 | A | 12/1994 | Yamagiwa | 180/219 |
| 5,377,776 | A * | 1/1995 | Saiki | 180/219 |
| 5,405,202 | A * | 4/1995 | Chi | 384/545 |
| 5,480,001 | A * | 1/1996 | Hara | 180/227 |
| 5,544,907 | A * | 8/1996 | Lin et al. | 280/288.3 |
| D378,996 | S | 4/1997 | Yaker | D12/110 |
| 5,704,442 | A | 1/1998 | Okazaki | 180/219 |
| 5,769,442 | A | 6/1998 | Robinson | 280/281.1 |
| 5,845,728 | A | 12/1998 | Itoh | 280/219 |
| 5,865,069 | A * | 2/1999 | Edwards | 74/551.1 |
| 5,913,529 | A | 6/1999 | Patterson | 280/281.1 |
| D412,139 | S | 7/1999 | Hanlon et al. | D12/126 |
| 5,921,339 | A * | 7/1999 | Matsuura | 180/219 |
| 5,964,474 | A * | 10/1999 | Chen | 280/279 |
| 5,975,230 | A | 11/1999 | Bourget | 180/225 |
| 5,984,336 | A * | 11/1999 | Hanafusa et al. | 280/281.1 |
| 6,024,371 | A | 2/2000 | Pasqualini | 280/281.1 |
| D425,453 | S | 5/2000 | Manescalchi | D12/110 |
| 6,142,498 | A | 11/2000 | Smith | 280/281.1 |
| 6,231,063 | B1 * | 5/2001 | Chi | 280/279 |
| 6,254,115 | B1 * | 7/2001 | Lin | 280/279 |
| 6,263,994 | B1 | 7/2001 | Eitel | 180/227 |
| D454,318 | S | 3/2002 | Schroeder et al. | D12/110 |
| 6,371,236 | B1 | 4/2002 | Fukunaga | 180/218 |
| 6,408,504 | B2 | 6/2002 | Yamaoka | 029/709 |
| 6,416,072 | B1 | 7/2002 | Mochizuki | 280/281.1 |
| 6,446,996 | B1 | 9/2002 | Horii | 280/281.1 |
| D464,293 | S | 10/2002 | Wightman et al. | D12/110 |
| 6,471,226 | B1 | 10/2002 | Klaas | 280/124.128 |
| 6,481,522 | B1 | 11/2002 | Adachi | 280/281.1 |
| 6,484,837 | B1 | 11/2002 | Buell | 180/225 |
| 6,502,658 | B1 | 1/2003 | Nagashii | 180/219 |
| 6,601,666 | B2 | 8/2003 | Okuma | 180/225 |
| D480,335 | S | 10/2003 | James | D12/110 |
| D480,664 | S | 10/2003 | James | D12/110 |
| D480,993 | S | 10/2003 | James | D12/110 |
| 6,651,525 | B2 * | 11/2003 | Jiang | 74/551.1 |
| D483,300 | S | 12/2003 | James | D12/110 |
| 6,679,347 | B2 | 1/2004 | Iimuro | 180/219 |
| 6,695,089 | B2 | 2/2004 | Adaci | 180/219 |
| 6,729,634 | B2 * | 5/2004 | Tange | 280/279 |
| 6,736,230 | B2 | 5/2004 | Yokomizo | 180/219 |
| D492,917 | S | 7/2004 | Pedersen | D12/110 |
| D494,106 | S | 8/2004 | Doll | D12/110 |
| D494,107 | S | 8/2004 | Lin | D12/110 |
| 6,779,620 | B2 * | 8/2004 | Taniguchi et al. | 180/219 |
| D498,179 | S | 11/2004 | James | D12/110 |
| D498,182 | S | 11/2004 | Davidson et al. | D12/117 |
| D498,708 | S | 11/2004 | James | D12/110 |
| 6,831,328 | B2 | 12/2004 | Austin | 257/328 |
| 6,846,018 | B2 * | 1/2005 | Dennert et al. | 280/785 |
| 6,883,818 | B1 * | 4/2005 | Chiang | 280/279 |
| 7,303,038 | B2 * | 12/2007 | Mathon | 180/219 |
| 2002/0084134 | A1 * | 7/2002 | Persson | 180/312 |
| 2005/0012299 | A1 * | 1/2005 | Schuman et al. | 280/288.3 |
| 2007/0045020 | A1 * | 3/2007 | Martino | 180/210 |

OTHER PUBLICATIONS

Hoyer, "CW Exclusive," Cycle World, vol. 44, No. 1, Jan. 2005, pp. 40-49.
http://streetfighters-usa.com/store.carbo_tech.html.

* cited by examiner

CARBON FIBER MOTORCYCLE FRAME

CROSS-REFERENCE TO RELATED APPLICATIONS

This application claims the benefit of priority to U.S. Provisional Application No. 60/648,365, filed Jan. 28, 2005, which is incorporated by reference herein in its entirety.

FIELD OF THE INVENTION

The disclosed subject matter relates generally to frames for motorcycles and components related thereto, and more particularly to motorcycle frame assemblies that comprise carbon fiber materials.

BACKGROUND

Conventional motorcycle frames use steel tubing welded into closed frameworks to interconnect various components (e.g., front assembly, seat, engine, etc.) and transmit the loads therebetween. The metal tubes keep the components in a substantially fixed spatial relation, i.e., they maintain the components relative proximity. Moreover, the metal tubes bear the in-plane and out-of-plane loads between the components.

Traditionally, metal motorcycle frames have a top tube that is connected at its front end to a relatively short head tube. Normally, the top tube extends generally horizontally backward under the gas tank and then under the seat. Typically, the top tube bifurcates under the seat into two tubes, which are each connected to a generally vertical rear support tubes. A pair of down tubes is usually connected at their front ends to the head tube and extend downwardly and then rearwardly under the engine, connecting at their ends to the rear support tubes. The vertical rear support tubes can be movably connected to a swing arm that supports the rear wheel in what is known in the art as a "soft tail" frame or can be fixedly connected at its top and bottom ends to tubes that converge together and support the rear wheel in what is known as a "hard tail" frame.

Such metal tube frames are relatively heavy, since they are typically formed from the extrusion or rolling and seaming of steel or other metal alloys. Moreover, conventional tube frames are limited in terms of aerodynamic improvements, as they are restricted to the use of tubes of generally circular cross-sections.

The strength of conventional metal frames can be compromised due to several factors. For example, the joints between each respective tube (e.g., for example, the connection between the head tube and top tube) are points of stress. Thus, any weakness in the joint will reduce the strength of the frame. Further, metal traditionally does not have a high flex modulus such that, in operation, high loads on sections of the frame can cause the frame to break or crack rather than flex. Metal frames are also relatively dense and can transmit vibrations from one point on the frame (e.g., under the engine or a front wheel assembly connected to the head tube) to other points on the frame (e.g., under the seat).

In light of these and other disadvantages (e.g., rust and corrosion) with conventional metal motorcycle frames, a need exists for a strong but lightweight motorcycle frame which has few joints, a higher flex modulus, and reduced vibrational transmission. The subject matter disclosed herein meets these and other needs.

SUMMARY

In accordance with the purposes of the disclosed materials, methods, and devices, as embodied and broadly described herein, the disclosed subject matter, in one aspect, relates to a frame assembly and methods for preparing and using such a frame assembly. In a further aspect, disclosed herein is a frame assembly for a motorcycle having an engine mounted thereon. The frame assembly has a longitudinal axis and a central plane that bisects the longitudinal axis. In one aspect, the frame assembly comprises a structural member comprising an engine compartment member that defines an opening constructed and arranged for mounting the engine therein. In another aspect, the opening of the engine compartment member has a contiguous inner surface, which is constructed and arranged to mount the engine thereon. In one embodiment, the structural member comprises a carbon fiber material.

In a further aspect, disclosed herein is a road motorcycle comprising an internal combustion engine, a transmission, and a frame assembly having a longitudinal axis and a central plane bisecting the longitudinal axis. In one aspect, the engine and transmission are configured to drive a rear wheel. In this aspect, the frame assembly comprises a structural member that comprises an engine compartment member, which defines an opening constructed and arranged for mounting the engine therein. In one aspect, the structural member comprises a carbon fiber material and forms a unitary structure.

The aspects described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

These and other features of the embodiments of the invention will become more apparent in the following detailed description in which reference is made to the appended drawings wherein.

DETAILED DESCRIPTION

The materials, methods, and devices described herein may be understood more readily by reference to the following detailed description of specific aspects of the disclosed subject matter, and to the methods and to the figures and their previous and following description.

Before the present materials, methods, and devices are disclosed and described, it is to be understood that the invention is not limited in its application to the details of construction and the arrangements of the components set forth in the following description or illustrated in the figures. The disclosed invention is capable of other embodiments and of being practiced or being carried out in various ways. It is also to be understood that the phraseology and terminology used herein is for the purpose of describing particular aspects or embodiments only and is not intended to be limiting. Further, the use or letters or numbers to identify elements or steps is simply for identification and is not meant to indicate that the elements or steps should be performed in a particular order.

Definitions:

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other assemblies, components, elements, integers, or steps.

As used in the specification and the appended claims, the singular forms "a," "an," and "the" include plural referents unless the context clearly dictates otherwise.

"Optional" or "optionally" means that the subsequently described event, circumstance, element, or member can or cannot occur or be present, and that the description includes instances where the event, circumstance, element, or member occurs or is present and instances where it does or is not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As noted, the frame assemblies and motorcycles disclosed herein have several elements and members. In one aspect, at least two of the various members and/or elements are connected. In one example that is not meant to be limiting, by "connected," or other forms of the word such as "connecting" or "connection," is meant that the members are, in one aspect, joined together in one process and without screws, nails, bolts, pins, welds, or clamps. For example, the connection between the various members in the disclosed structural member can be such that the structural member forms, and can be referred to herein, as one piece or a continuous structure. It is of course contemplated that "connected" can mean any connection made by any conventional means.

Also, when referring to some of the members and components of the disclosed frame assemblies and motorcycles, the use of the term "tube" is simply for descriptive purposes; it does not imply that the members or components or portions thereof have a circular or generally circular shape. Also, the word "tube" should not be construed to limit the members or components to being hollow. By "tube" is meant any shape (e.g., triangular, square, rectangular, oval, or irregular cross-section) and solid, semi solid, and hollow structures.

In one aspect, disclosed herein is a frame assembly 20 for a motorcycle 2 having an engine 10 mounted thereon. The disclosed frame assembly has a longitudinal axis L and a central plane bisecting the longitudinal axis. The frame assembly 20 can be of any size. For example, it can be increased or decreased in size as desired, for example, to fit a rider's particular height and build, to accommodate a particular size engine, to accommodate a particular size tire, preference, and the like. In one aspect, the frame assembly forms a single, continuous unit.

In a further aspect, the disclosed frame assembly 20 comprises a structural member 30. In one aspect, the structural member forms one integral unitary structure. In a further aspect, the structural member 30 comprises an engine compartment member 32 that defines an opening 34, which is constructed and arranged for mounting the engine 10 therein. In one aspect, the opening 34 of the engine compartment member 32 has a contiguous inner surface 36, at least of portion of which is constructed and arranged to mount the engine thereon. In other aspects, a transmission 12 operatively connected to the engine, can be mounted thereon a portion of the contiguous inner surface 36 of the engine compartment member. In one embodiment of the frame assemblies 20 disclosed herein, the structural member 30 comprises a carbon fiber material, examples of which are disclosed herein.

In one aspect of the exemplary frame assemblies disclosed herein, the engine compartment member 32 is positioned therein the central plane of the frame assembly. In other aspects, at least a portion of the contiguous inner surface 36 of the engine compartment member 32 extends peripherally about at least a portion of the engine 10. In still further aspects, portions of the contiguous inner surface 36 of the engine compartment member are positioned in the central plane of the frame assembly 20.

As noted, the engine compartment member 32 can define an opening 34 constructed and arranged for mounting the motorcycle engine therein. In one example, the opening 34 defined therein the disclosed engine compartment member can surround at least a portion of the mounted motorcycle engine. In some examples, the opening 34 of the engine compartment member 32 is configured to circumferentially surround at least a portion of one or more elements such as a primary, a transmission, a battery, an oil filter, a gas tank, a carburetor, and the like, which are mounted therein the opening 34.

In other aspects of the frame assembly 20, the structural member 30 can comprise a head tube member 40 that is connected to a front portion 38 of the engine compartment member 32. The head tube member can comprise a tubular head pipe 42 that is adapted to journal a front wheel for steering movement. In an additional aspect, the head tube member 40 is positioned at an acute angle relative to an upright axis U of the frame assembly 20.

In other aspects, the engine compartment member 32 can comprise a top member 50 having a proximal end 52 that is connected to a portion of the head tube member 40 to form a portion of the front portion 38 of the engine compartment member. In a further aspect, the top member 50 extends in a generally rearward direction from the head tube member 40. In an additional aspect, at least a portion of the top member 50 can be tubular.

In one aspect, the top member 50 defines an aperture 54 therebetween the proximal end and distal end of the top member. In one example, the aperture 54 is sized and shaped to complementarily receive a portion of an exterior surface 62 of a gas tank 60. In one aspect, the aperture 54 is formed adjacent to the front portion of the engine compartment member 32.

The complementary shapes of the gas tank 60 and the aperture 54 arranged for receiving a portion of the gas tank depends on factors such as, for example, the volume of gas, style, preference, and the like. The gas tank 60 can be connected to, bolted to, or fixedly attached thereto the aperture 54 of the top member 50. As one will appreciate, the particular shape of the top member 50 can be determined based on preference, depending on the particular style of the frame assembly 20, the size and shape of the gas tank, the size and shape of the seat, comfort, and the like. In one aspect, the aperture 54 has a tear-drop shape that extends rearwardly away from the front portion 38 of the engine compartment member 32.

In a further aspect, engine compartment member 32 of the frame assembly 20 can further comprise a down tube member 70. A proximal end 72 of the down tube member 70 is connected to a portion of the head tube member 40 to form a portion of the front portion 38 of the engine compartment member 32. In one aspect, the down tube member 70 extends in a generally rearward direction from the head tube member 24. In one aspect, the top member 50 is positioned generally above the down tube member 70. Further, in other aspects, the down tube member 70 can comprise a single down tube member or a plurality of down tube members. For example, the plurality of down tube members can comprises a pair of opposing down tube members. Of course, for example and not meant to be limiting, it is contemplated that the disclosed frame assemblies 20 can have three, four, five or more down tube members 70.

In one example of the disclosed frame assembly 20, the down tube member 70 is connected at its top end 72 to the head tube member 40. The down tube member can also be connected to the top member 50 below the connection with the head tube member 40. In one alternative, it is contemplated herein that the top member 50 can be directly connected to the head tube member 40 and the down tube member 70 can also be connected to the head tube member. In another alternative, it is contemplated that the top member 50 can be connected to the head tube member 40 and the down tube member 70 can be connected to the top member 50. The particular angular relationship between the head tube member 40, the down tube member 70, and the top member 50, or the "rake" of the frame assembly 20, can be from about 28 to about 44 degrees, from about 30 to about 42 degrees, from about 32 to about 40 degrees, or from about 34 to about 38 degrees. In other examples, the rake can be about 28, 29, 30, 31, 32, 33, 34, 35, 36, 37, 38, 39, 40, 41, 42, 43, or 44 degrees, where any of the stated values can form an upper or lower endpoint as appropriate.

The down tube member 70 can have any cross-sectional shape. For example and not meant to be limiting, the down tube member can have a circular or non-circular cross-sectional shape. Exemplary non-circular cross-sectional shapes, such as, for example, an elliptical or oval cross-sectional shape, a teardrop shape, and the like, can offer aerodynamic advantages.

In a further aspect of the frame assemblies 20 disclosed herein, the engine compartment member 32 further comprises a bottom member 80. In one aspect, a front end 82 of the bottom member 80 is connected to a distal end 74 of the down tube member 70. In another aspect, the bottom member extends in a generally rearward direction from the distal end of the down tube member 70. The bottom member 80 has a top surface 84, at least a portion of which can be adapted for mounting the engine 10 thereon. In other examples, at least a portion of the top surface 84 of the bottom member can be adapted for mounting the engine and the transmission thereon. Of course, it is contemplated that the respective dimensions of a bottom member 80 can vary depending on, inter alia, the size of the engine and/or transmission to be mounted thereon. In a further aspect, at least a portion of the bottom member 80 is tubular. The bottom member 80 can be prepared in the same way as the frame, as disclosed herein below. Also, it is contemplated that the bottom member 80 can comprise metal fittings or a metal plate configured for receiving engine mounting hardware. In various exemplary aspects, at least a portion of the metal fittings or metal plate is integral with the bottom member 80.

In a further aspect of the frame assemblies, the engine compartment member 32 can further comprise a seat pillar 90 that extends between the distal end 56 of the top member 50 and the back end 86 of the bottom member 80. In one aspect, a distal portion 57 of the top member 50 and a top portion 92 of the seat pillar 90 comprise at least a portion of a seat 94. In some examples disclosed herein, the seat pillar 90 extends in a generally upright direction. In one example, the seat 94 is connected to the top end 96 of a seat pillar 90.

In an additional embodiment, the structural member 30 comprises an arm member 100 that is connected to a portion of the seat pillar. In one aspect, the arm member extends in a generally rearward direction from the seat pillar. A distal portion 102 of the arm member is adapted to rotatably support a rear wheel. In use, the engine is adapted to drive the rear wheel at least partially via, for example and not meant to be limiting, a chain drive, a belt drive, shaft/gear drive, and the like. It alternative aspects, it is contemplated that the arm member 100 can be fixed relative to the structural member 30 or is allowed to pivot with respect to the seat pillar 90 of the structural element such that it forms a swing arm. Such a swing arm can be metal or carbon fiber based and is pivotally mounted to the seat pillar 90. In another aspect, the arm member 100 is operatively connected, either fixed or pivotally, to a lower portion 98 of the seat pillar 90.

In a further aspect, the arm member 100 can comprise a pair of opposing arm members 100a, 100b that are spaced a predetermined distance apart. The predetermined distance being defined by the size of the rear wheel mounted therebetween as well as other elements of the motorcycle drive assembly that are conventionally mounted between the arm members. It is contemplated that the arm member can be any shape, size, or design, depending on such factors as the size of the tire, style, preference, and the like. In this aspect, the opposing arm members are positioned on opposite sides of the seat pillar 90 and extend backwards therefrom.

In another example, the arm member 100 can define a bore 104 that extends substantially transverse to the longitudinal axis of the frame assembly 20. In operation, the bore of the arm member is configured for rotatably mounting the rear wheel of the motorcycle with respect to the arm member. In one exemplary aspect, the bore 104 is defined in a distal portion of the arm member. To complementarily mount a conventional axle assembly of the rear wheel, in one aspect, a sleeve 110 that is sized and shaped for disposition therein the bore is mounted in the bore. The sleeve 110 can be formed of a wear resistant material, such as, for example and not meant to be limiting, a rigid metal or polymer. In another aspect, the arm member 100 defines at least one opening 108 in a front portion 106 of the arm member through which a portion of a drive means, such as, for example, a drive chain, can pass through the arm member. Of course, it is contemplated that, in another example, the arm member 100 is formed without the defined opening 108 in the front portion.

In further aspects of the disclosed frame assembly 20, the structural member 30 can further comprise a fender 120 that is connected to a top portion 96 of the seat pillar 90. The fender 120 extends in a generally rearward direction from the top portion of the seat pillar 90. At last a portion of the fender is sized and shaped to overlie at least a portion of a rear wheel rotatably mounted on the arm member. Still further, the structural member 30 can further comprise a fender 120 that is connected to at least a portion of the seat 94. In this aspect, the fender 120 extends in a generally rearward direction from the seat 94, and is adapted to cover at least a portion of the rear wheel. It is contemplated that the fender 120 can be any shape, size, or design, depending on such factors as the size of the tire, style, preference, and the like.

In an embodiment disclosed herein, a road motorcycle of the present invention comprises an internal combustion engine (e.g., a V-twin internal combustion engine) 10, a transmission 12, and a frame assembly 20, as disclosed herein. In many aspects of the disclosed motorcycle, the engine and transmission are configured to drive a rear wheel. Any of the frame assemblies 20 disclosed herein are suitable for use in the disclosed motorcycles. Further disclosed is a motorcycle 2 comprising the frame assembly 20 disclosed herein and an engine 10.

In many aspects of the disclosed motorcycles, the transmission 12 is positioned rearwardly of the engine 10 therein the opening 34 of the engine compartment member 32. Further, as noted above, the head tube member 40 can comprise a tubular head pipe 42 adapted to journal a front suspension assembly that is rotatably supported by the head pipe and rotatably supports a front wheel for steering movement.

Also, the disclosed motorcycles and frame assemblies of the present invention can further comprise at least one layer of carbon fiber. In one aspect, the gas tank 60 has an exterior surface 62 and at least one layer of carbon fiber is mounted therein a portion of the exterior surface of the gas tank that extends beyond the aperture 54 of the top member 50 when the gas tank 60 is received therein. In this aspect, it is contemplated that the layer(s) of carbon fiber that overlie the exterior surface 62 of the tank can be integrated with the carbon fiber material that forms the top member 50.

As noted above, the motorcycle of the present invention can also comprise a chain or belt drive that is operatively connected to the transmission and the rear wheel of the motorcycle. In one aspect, the opening 108 defined in the arm member 100 is positioned between the transmission and the rear wheel such that the chain or belt passes therethrough the opening.

Also, in the disclosed frame assemblies and motorcycles of the present invention, the structural member 30 comprises a carbon fiber material. That is, the structural member 30 can be comprised entirely or substantially of carbon fiber. In alternative embodiments, a portion of the structural member 30 can be comprised of carbon fiber. For example, as described above, the disclosed structural member 30 can comprise one or more of a top member 50, a head tube member 40, a down tube member 70, a seat pillar 90, arm member 100, and bottom member 80. In a further aspect, at least one of the various members are generally hollow and are comprised entirely or substantially of carbon fiber.

It is contemplated, however, that one or more members or elements of the disclosed structural member 30 can contain various metal elements, for example, metal elements can be used where portions of the structural member 30 will come in contact with other metal. As an example, the disclosed structural member 30 can contain a metal flange, sleeve, metal receiving element, or the like where the structural member 30 would contact a metal threaded object like a bolt or axel. Also, the structural member can comprise small metal tubes or ports for fluids, cables, or wires. Still further, the structural member 30 can comprise a metal gas tank 60, optionally wrapped in carbon fiber, and connected to the structural member as disclosed herein. However, it is contemplated that the gas tank of the present invention can be comprised of carbon and/of carbon fiber and is not a conventional metal gas tank. Despite such limited uses of metal, however, the disclosed frame can be considered to be comprised entirely or substantially of carbon fiber. It is contemplated that substantially all of the structural loading of the frame assembly is supported by the carbon fiber.

In one specific aspect, "comprised substantially of carbon fiber" can refer to a structural member 30 that contains less than about 50%, less than about 45%, less than about 40%, less than about 35; less than about 25%, less than about 20%, less than about 15%, less than about 10%, less than about 5%, less than about 1%, or 0% metal based on the total weight of the structural member. Also, it is contemplated that exemplary embodiments of the structural member 30, as disclosed herein, need not contain metal structural supports. In another example, one or more of the various members of the disclosed structural member can be at least partially hollow. In one aspect, all or substantially the entire structural member 30 is hollow and comprised substantially of carbon fiber. Also, one or more of the various members (e.g., top member, head tube member 40, down tube member, bottom member, seat pillar, and/or arm member) of the disclosed structural member 30 can, in another example, be substantially solid.

The frame assemblies 20 disclosed herein, and members and elements thereof, can use sheets and surfaces of carbon fibers and composites thereof to impart stiffness rather than tubes of metal as in conventional frames. In one aspect, the frame assemblies disclosed herein can be made, as described below, from a continuous piece of carbon fiber composite. It is understood that by "continuous piece of carbon fiber composite" is meant that the carbon fiber is laid, wrapped, or formed to the desired structure in a continuous process to result in a structure that is visibly a single unitary structure. It is contemplated that sheets can be cut in various pieces, laid in varying patterns, and more than one layer of fiber can be used. In a further aspect, the frames disclosed herein can be made from various layers or sheets, in various orientations, of carbon fiber composites. While not wishing to be bound by theory, it is expected that only under the transmission will there be a flexure. This can be an area where the carbon fiber is thinner and is allowed to flex like a leaf spring.

It is also possible to increase damping and reduce stress at this point when torque is applied through the rear tire by including an upper arm leading member under the seat to act as a pushrod and connect to a spring and damper. This can allow for some control over the torque issues as well as a damping. In another aspect, the seat portion 30 of the top member 50 can wrap over the sides of the seat pillar 90 and fold under it; which forms a continuous part from the tank all the way to the support arms 34.

In one aspect, disclosed herein are frame assemblies that are visibly single structures of carbon fiber from the head tube member 40, to the top member 50 and down tube 22 member, to the bottom member 80 under the engine, to the seat pillar 90, all the way to the arm member 100 and, optionally, the fender 46.

In the disclosed frame assembly 20, the engine does not act as a structural support element. In many conventional motorcycle frames, the engine is necessary to transmit stresses. In the disclosed carbon fiber based frame, however, the frame is functional without the engine. That is, the frame is structurally self-supporting.

Examples of suitable engines that can be used with the disclosed frames include, but are not limited to, 50 to 250 cubic inches, or 64 to 210 cubic inches. In other examples, the disclosed frames can be used with engines that weigh between about 75 to 250 lbs or about 100 to 200 lbs.

Figure 1:
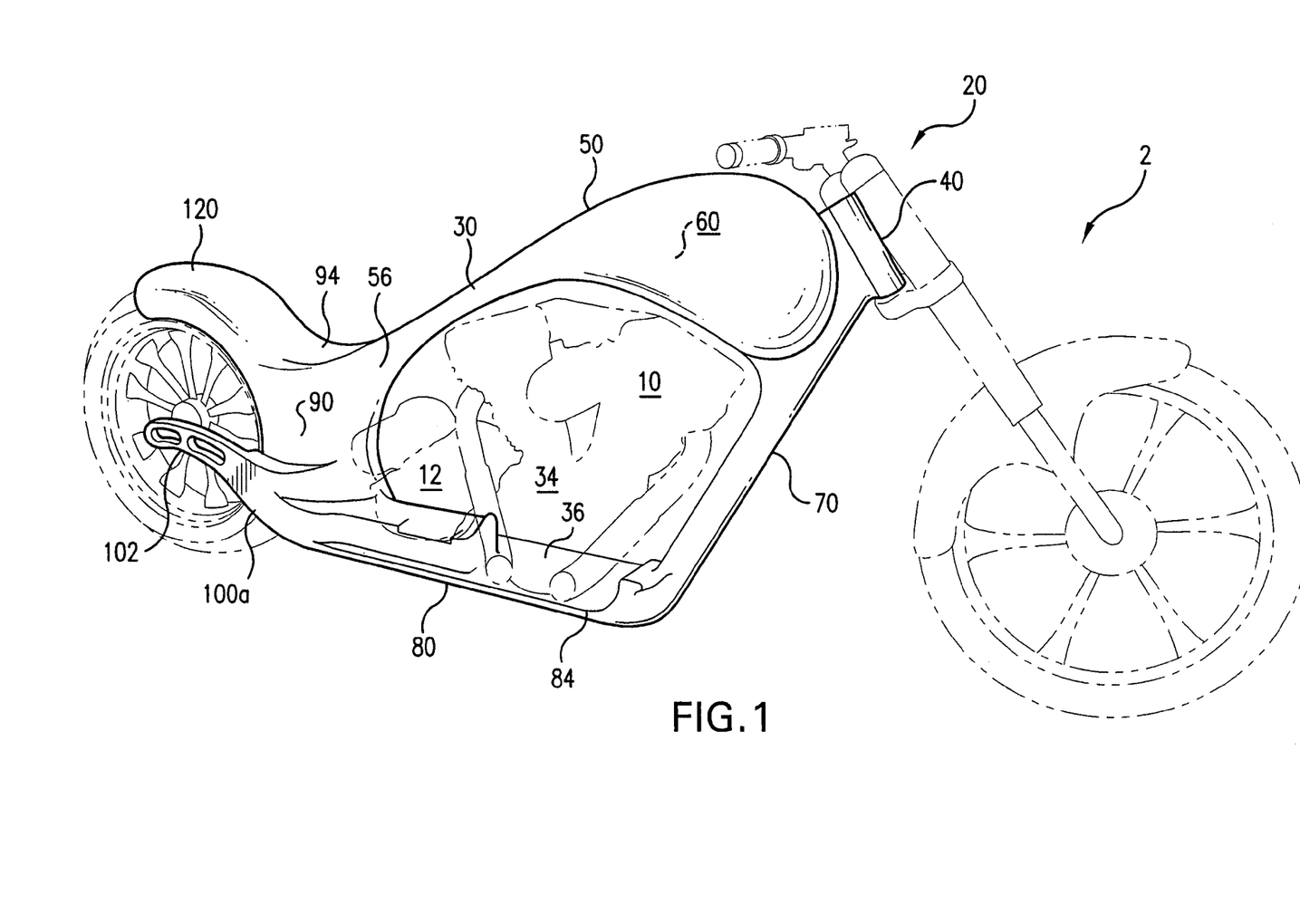
FIG. 1 is a front perspective view of a motorcycle having a motorcycle frame of the present invention.
Figure 2:
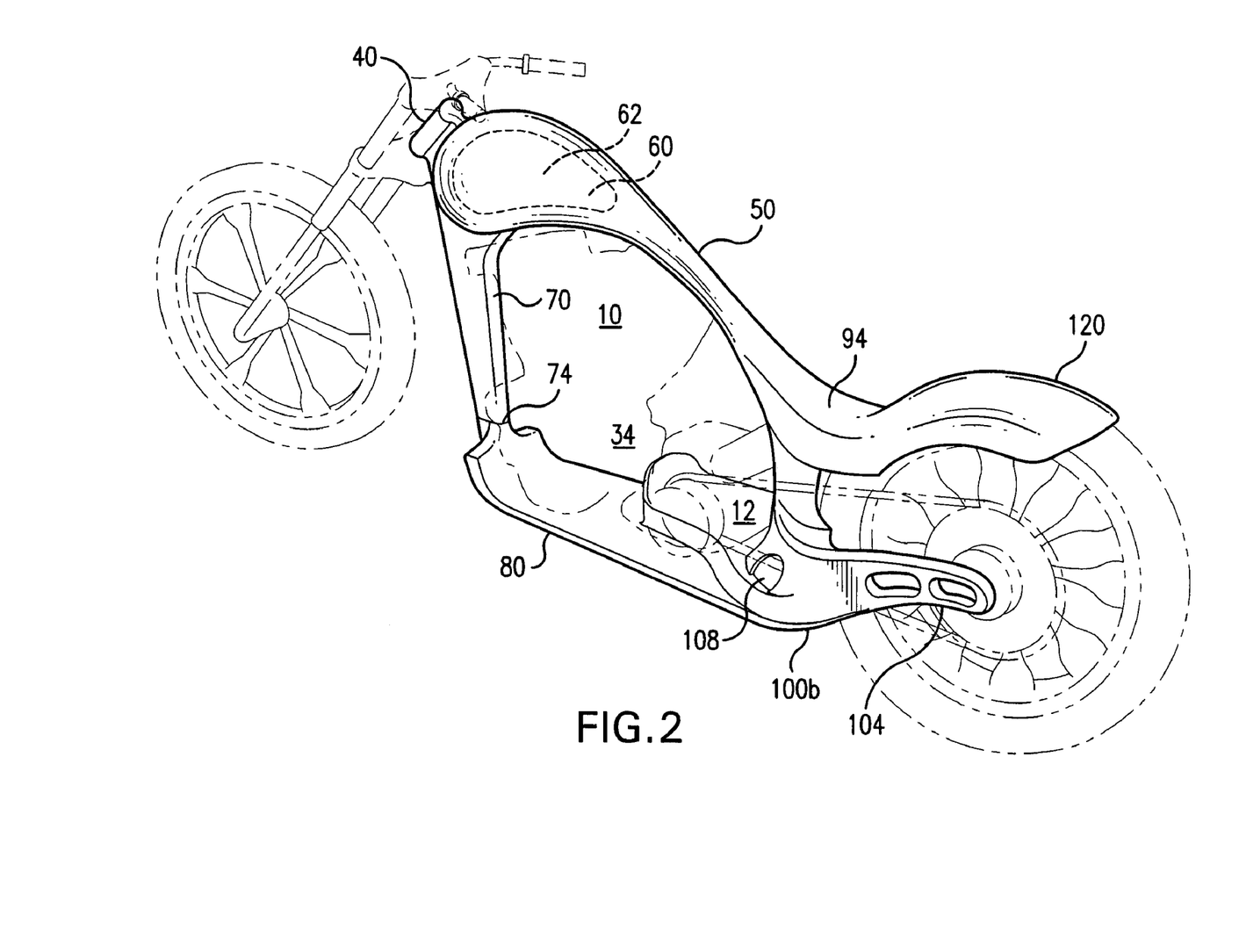
FIG. 2 is a rear perspective view of the motorcycle frame of FIG. 1.
Figure 3:
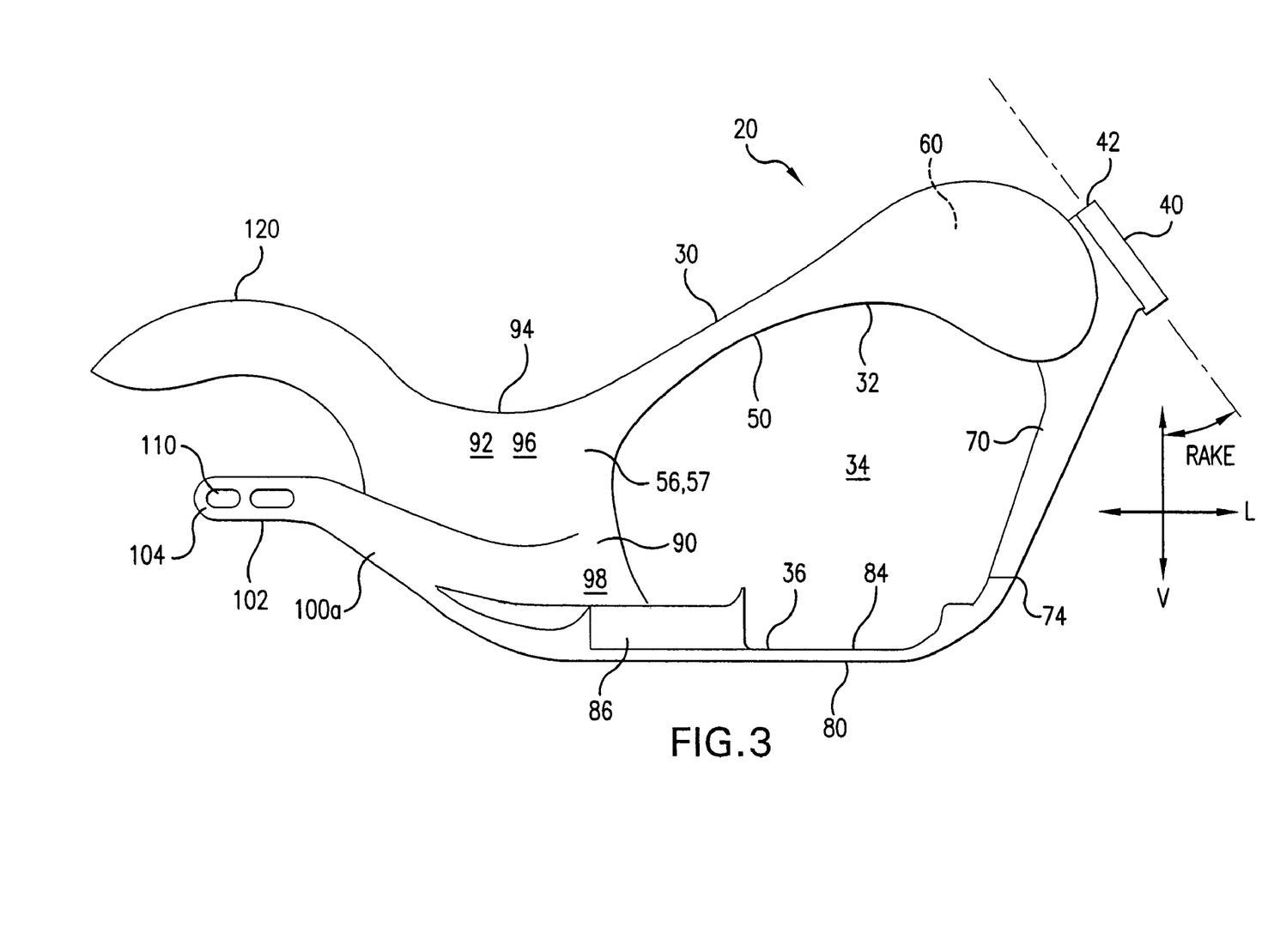
FIG. 3 is a left side elevational view of the motorcycle frame of FIG. 1.
Figure 4:
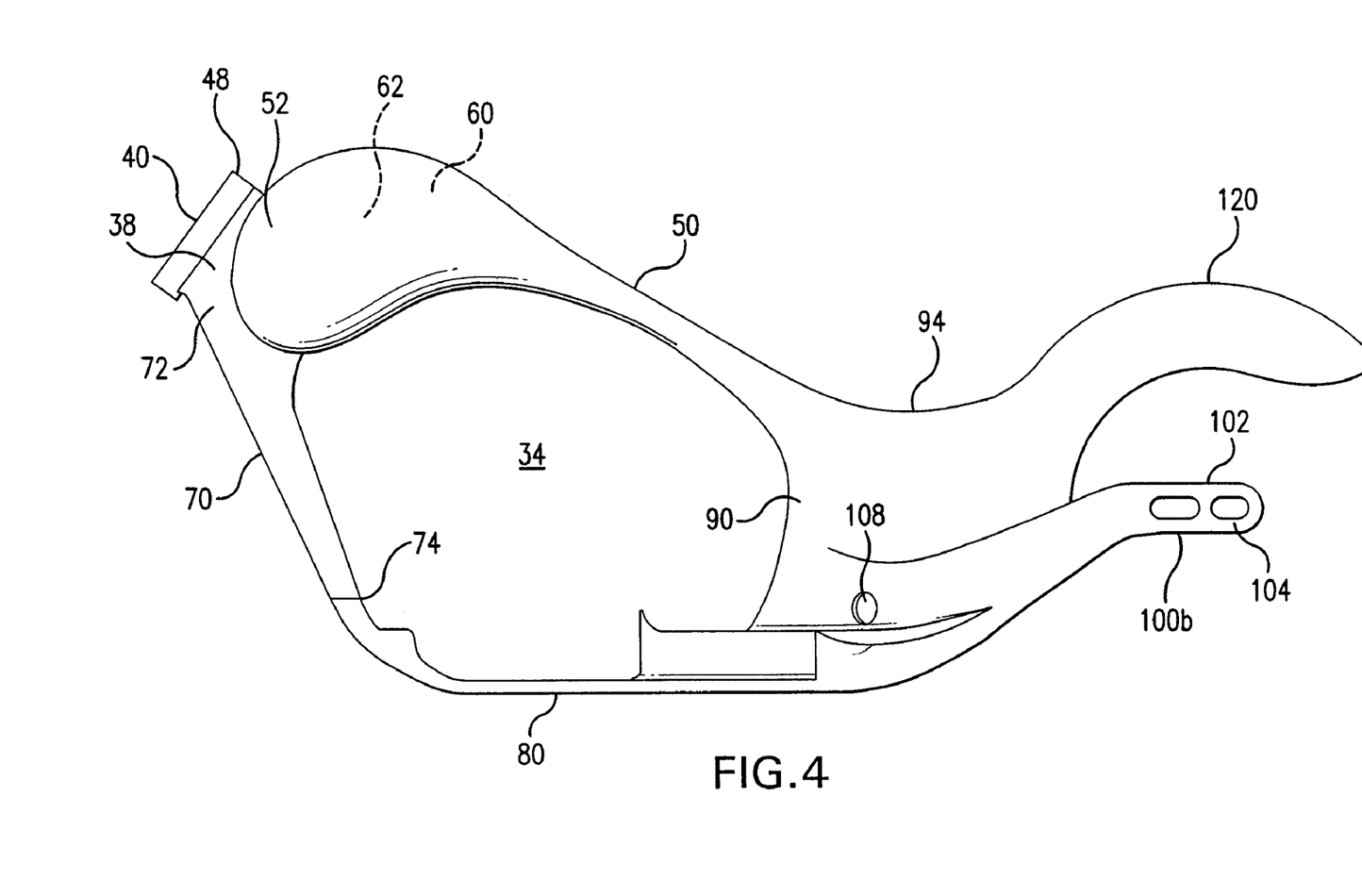
FIG. 4 is a right side elevational view of the motorcycle frame of FIG. 1.
Figure 5:
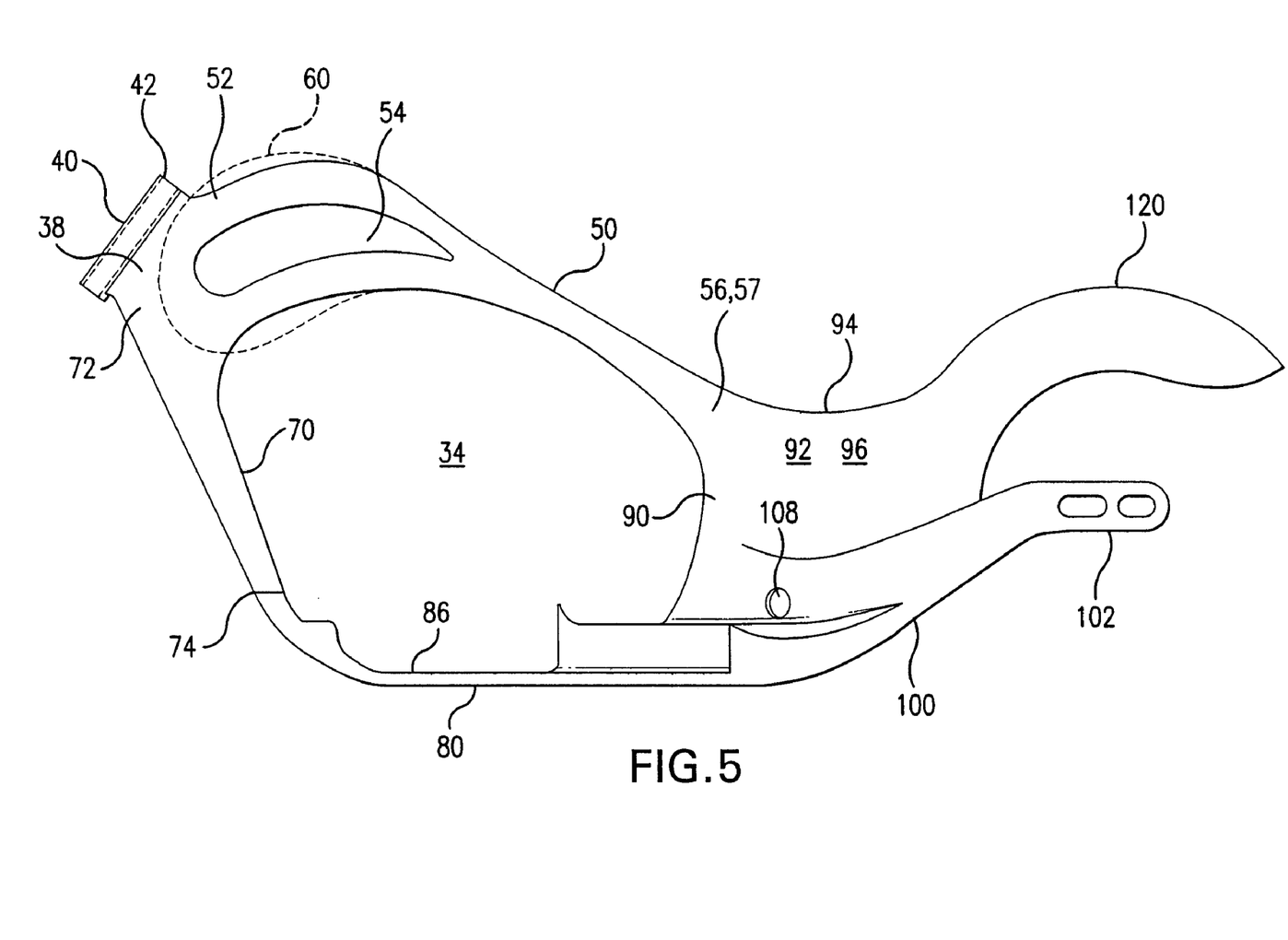
FIG. 5 is a left side elevation view of the motorcycle frame of FIG. 1, without the gas tank mounted to the top member of engine compartment member.
Figure 6:
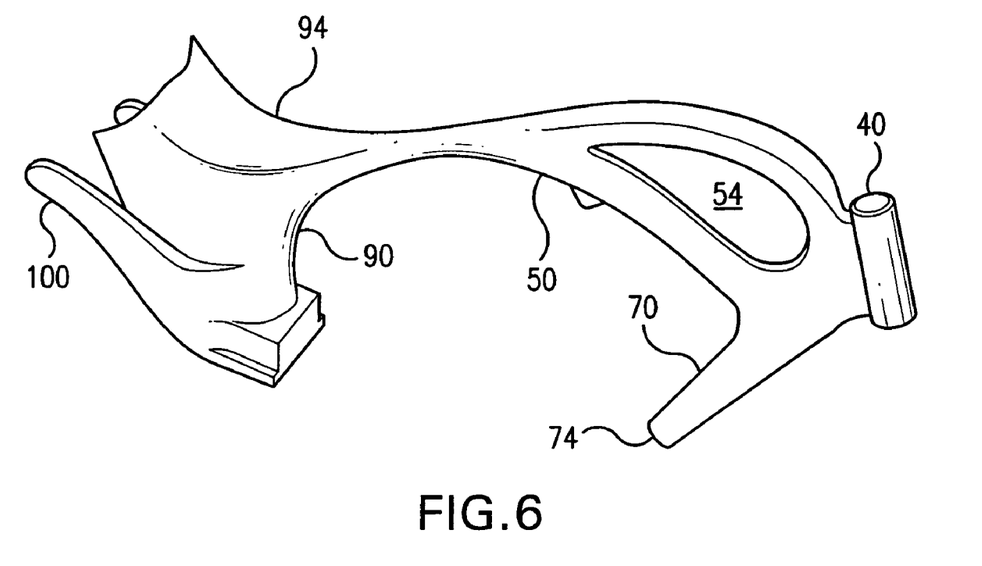
FIG. 6 is a partial perspective view of a portion of the motorcycle frame of FIG. 1 after initial release from the mold.
Figure 7:
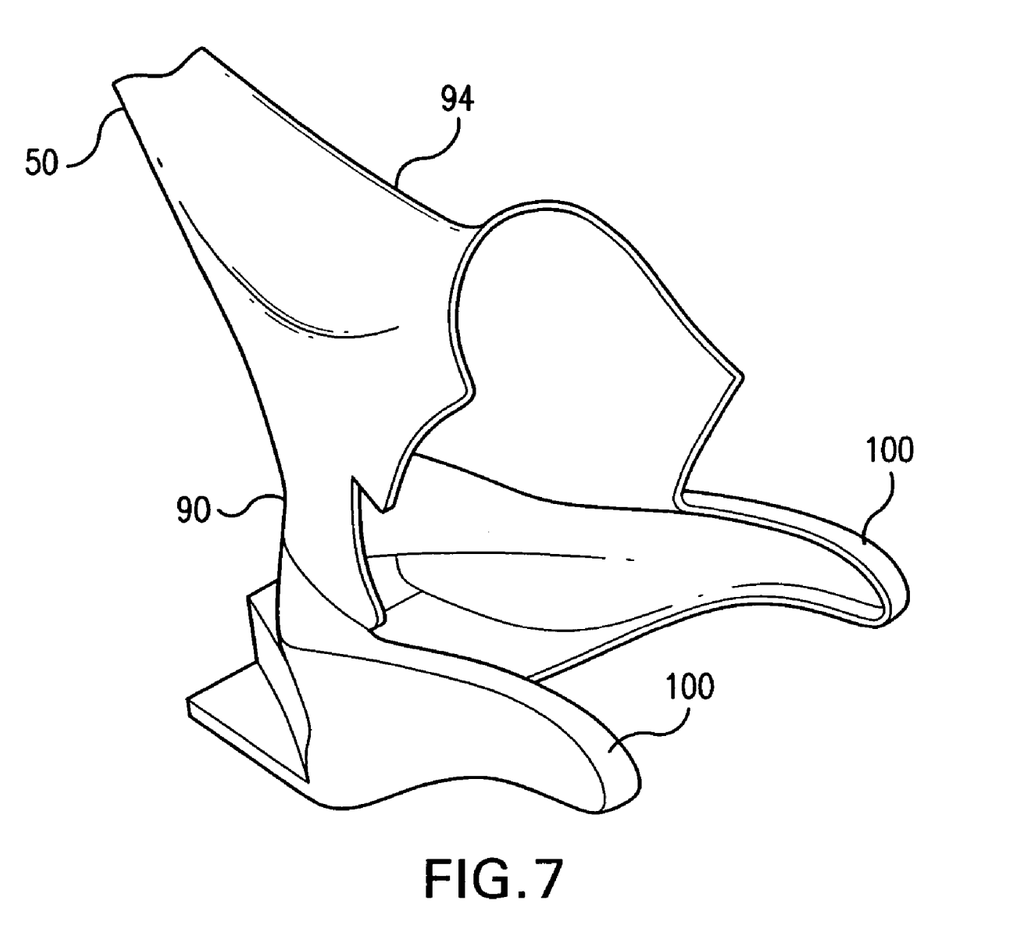
FIG. 7 is a rear perspective view of the motorcycle frame of FIG. 6.
Figure 8:
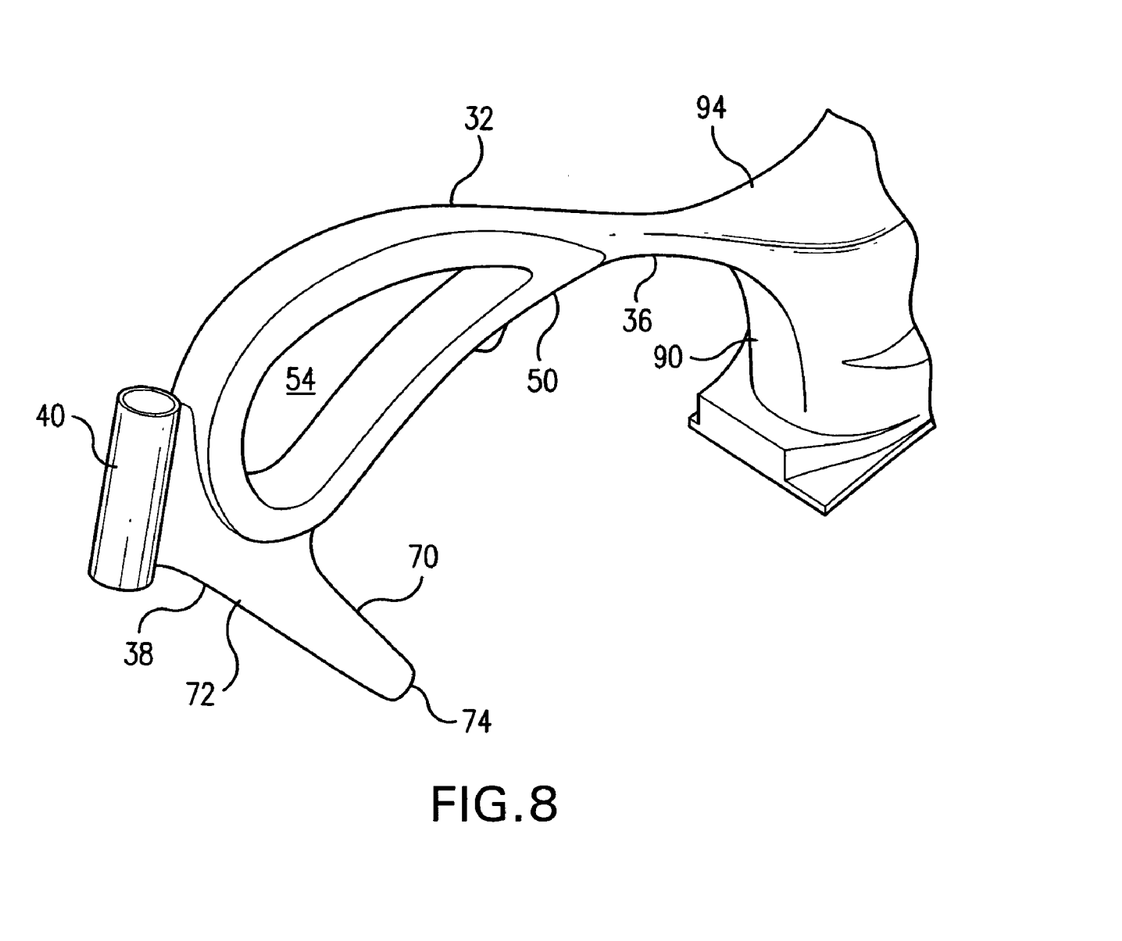
FIG. 8 is a from perspective view of the motorcycle frame of FIG. 6.
Figure 9:
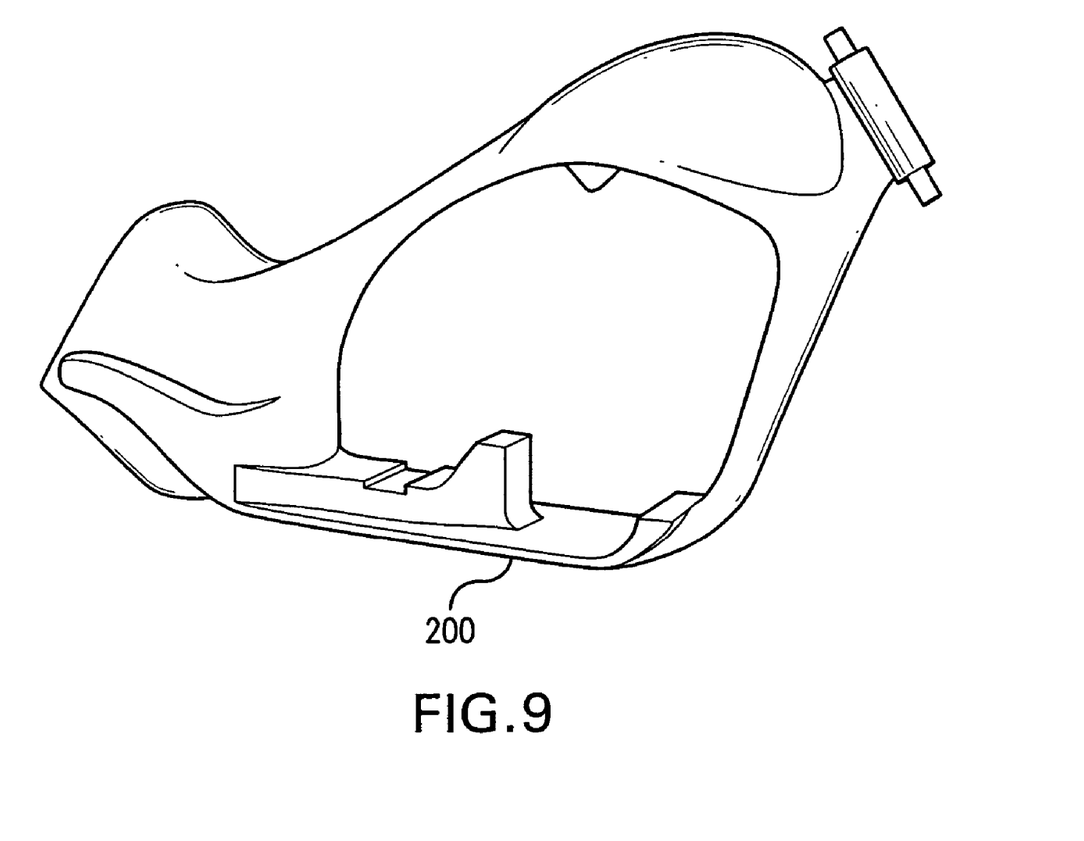
FIG. 9 is a perspective view of an exemplary mold used to prepare the motorcycle frame of the present invention.

In one example, the process of making a frame as described herein involves first preparing a mold structure as shown in FIGS. 3 and 4. The mold structure can be, as shown in these Figures, two halves that are brought together to form a complete mold structure 200, as shown in FIG. 5. The mold structures can be made of any material, but will typically be made of a material suitable for wrapping with carbon fiber. In one aspect, the mold structures can be made of a thermosetting polymer such as, but not limited to, polyolefins (e.g., PVC, LDPE, HDPE, PS, PP, butadiene polymers, ABS, polyacrylamide, poly(methyl)methacrylate), polyesters (e.g., PET), polyamides, polycarbonates, and the like.

The size and shape of the mold structures will determine the size and shape of the frame assembly 20. The size and shape can be any size and shape but will generally depend on such factors as the rider's particular height and build, the size of the engine, the size of the wheels, the rake, style, preference, and the like.

The frame assembly 20 can be formed from the mold structure 200 by the lamination of pre-impregnated composite fabric (a fabric enriched with resin when purchased to ensure consistency) into the mold, vacuum bagging the mold to retain consolidation of the fibers and fabrics, and curing in an autoclave.

As disclosed herein, the structural member 30 of the frame assembly 20 comprises carbon fiber. Carbon fiber is a polymeric form of graphite, a form of pure carbon. As used herein the term "carbon fiber" is meant to include carbon fiber and composites made from or with carbon fibers. Typically, carbon fiber composites comprise carbon fibers and an epoxy or thermosetting material. Suitable carbon fibers that can be used in the frame disclosed herein include, but are not limited to, advanced high strength carbon fibers in the following yarn sizes (note K=1000 filaments), 24K, 12K, 6K, 3K, and 1K, specialized carbon fibers such as intermediate and high modulus grades, lower cost carbon fibers 320K, 120K 40K and 24K, activated carbon fibers, chopped carbon fiber, milled carbon fiber, and recycling waste carbon fiber. In one aspect, pre-impregnated carbon fiber can be used.

In another aspect, KEVLAR™ can also be used to make the portions of the structural member 30. In another aspect, hybrids of carbon fiber and KEVLAR™ can be used in the frame assemblies disclosed herein. Suitable carbon fibers, KEVLAR™ fibers, and hybrids of the two, which can be used in the methods disclosed herein can be obtained commercially from such sources as Fiber Glast Development Corp. (Brookville, Ohio), US Composites (West Palm Beach, Fla.), and Toray (New York, N.Y.).

The disclosed frame assemblies, in one aspect, can be comprised mainly of carbon fiber but can also be laminated in some areas to include glass fibers. This can allow "I" value (material thickness resulting in stiffness) without the expense of high modulus fibers near the neutral axis of the section where, in some examples, they may not be desired or are not necessary. There are many combinations of fiber and weave types that will work in the disclosed frames. It can be desired that the fibers and weave types be used in a manner appropriate to their makeup (e.g., unidirectional fibers can be loaded in their axis, twill fabric where there are shear loads).

The "thickness" of the carbon-fiber members varies. For example, the thickness of the carbon fiber at the connection between the head tube and the top tube and/or down tube is generally thicker than the remainder of the frame. Similarly, the thickness of the rear wheel support member is generally thicker than the remainder of the frame. For example, and not meant to be limiting, the thickness can range between about 200 mils to about 3 to 4 inches.

It is also possible to use color carbon fiber in the frames disclosed herein.

The advantageous features of the frame disclosed herein are not limited to motorcycles. Although the detailed description refers to the frame in the form of a motorcycle frame and components, many other applications are readily apparent. Examples of other applications include, but are not limited to, bicycles and other human-powered vehicles, mini-bikes, pocket-bikes, all terrain vehicles (ATV's), and the like.

The disclosed frames have many advantages. For example, the disclosed frames can be lighter than conventional metal frames. Being lighter allows motorcycles having the disclosed carbon fiber based frames to consume less gas and to have a higher power to weight ratio. The power to weight ration can be 2, 3, 4 or more times that of conventional metal frames. Also, the disclosed frames can offer better handling that conventional metal frames. Further, the disclosed frames, being light, result in less force in a crash. Another advantage of the disclosed frames is the fact that they resist fatigue when stressed.

While specific embodiments of the invention have been described and shown in the Figures, further variations will be apparent to those skilled in the art, and the invention should not be construed as limited to the specific forms shown and described. The scope of the invention is to be determined solely by the following claims. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A frame assembly for a motorcycle having an engine mounted thereon, the frame assembly having a longitudinal axis and a central plane bisecting the longitudinal axis, comprising:

a structural member comprising:

a head tube member; and an engine compartment member that defines an opening constructed and arranged for mounting the engine therein, the opening of the engine compartment member having a contiguous inner surface that is substantially bisected by the central plane, which is constructed and arranged to mount the engine thereon, the engine compartment member comprising a top member, wherein a proximal end of the top member is connected to a portion of the head tube member and forms a portion of a front portion of the engine compartment member, wherein the top member extends in a generally rearward direction from the head tube member, wherein the head tube member is connected to the front portion of the engine compartment member; and a gas tank, wherein a portion of the top member of the engine compartment member defines an aperture constructed and arranged for receiving a portion of the gas-tank therein, wherein the structural member comprises a carbon fiber material.

2. The frame assembly of claim 1, wherein at least a portion of the contiguous inner surface of the engine compartment member extends peripherally about at least a portion of the engine.

3. The frame assembly of claim 1, wherein the head tube member comprises a tubular head pipe adapted to journal a front wheel for steering movement.

4. The frame assembly of claim 1, wherein the head tube member is positioned at an acute angle relative to an upright axis of the frame assembly.

5. The frame assembly of claim 1, wherein the aperture is formed adjacent to the front portion of the engine compartment member, and wherein the aperture has a tear-drop shape that extends rearwardly away from the front portion of the engine compartment member.

6. The frame assembly of claim 1, wherein at least a portion of the top member is tubular.

7. The frame assembly of claim 1, wherein the engine compartment member further comprises a down tube member, wherein a proximal end of the down tube member is connected to a portion of the head tube member and forms a portion of the front portion of the engine compartment member, and wherein the down tube member extends in a generally rearward direction from the head tube member.

8. The frame assembly of claim 7, wherein the top member is positioned above the down tube member.

9. The frame assembly of claim 8, wherein the engine compartment member further comprises a bottom member, wherein a front end of the bottom member is connected to a distal end of the down tube member, and wherein the bottom member extends in a generally rearward direction from the distal end of the down tube member.

10. The frame assembly of claim 9, wherein the bottom member has a top surface, the top surface being adapted for mounting the engine thereon.

11. The frame assembly of claim 10, wherein at least a portion of the bottom member is tubular.

12. The frame assembly of claim 9, wherein the engine compartment member further comprises a seat pillar extending between the distal end of the top member and a back end of the bottom member.

13. The frame assembly of claim 12, wherein a distal portion of the top member and a top portion of the seat pillar comprises a seat.

14. The frame assembly of claim 12, wherein the seat pillar extends in a generally upright direction.

15. The frame assembly of claim 12, wherein the structural member further comprises a fender that is connected to a top portion of the seat pillar, wherein the fender extends in a generally rearward direction from the top portion of the seat pillar, and wherein the fender is adapted to cover at least a portion of a rear wheel.

16. The frame assembly of claim 12, wherein the structural member further comprises a fender that is connected to the seat, wherein the fender extends in a generally rearward direction from the seat, and wherein the fender is adapted to cover at least a portion of a rear wheel.

17. The frame assembly of claim 12, wherein the structural member further comprises an arm member that is connected to a portion of the seat pillar, wherein the arm member extends in a generally rearward direction from the seat pillar, wherein a distal end portion of the arm member is adapted to rotatably support a rear wheel, and wherein the engine is configured to drive the rear wheel.

18. The frame assembly of claim 17, wherein the arm member comprises a pair of opposing arm members that are spaced a predetermined distance apart.

19. The frame assembly of claim 18, wherein the arm member is pivotally mounted thereto the portion of the seat pillar.

20. The frame assembly of claim 18, wherein the arm member is connected to a lower portion of the seat pillar.

21. The frame assembly of claim 17, wherein the distal end of the arm member defines a bore, and further comprising a sleeve sized and shaped for disposition therein the bore of the arm member.

22. The frame assembly of claim 17, wherein the arm member defines an opening therein a front portion of the arm member.

23. The frame assembly of claim 1, wherein the structural member forms one integral unitary structure.

24. A frame assembly for a motorcycle having an engine mounted thereon, the frame assembly having a longitudinal axis and a central plane bisecting the longitudinal axis, comprising:

a structural member that comprises a carbon fiber material, comprising:

a head tube member; and an engine compartment member that defines an opening constructed and arranged for mounting the engine therein, the opening of the engine compartment member having a contiguous inner surface that is substantially bisected by the central plane, which is constructed and arranged to mount the engine thereon, the engine compartment member comprising a top member, a down tube member, and a bottom member, wherein a proximal end of the top member is connected to a portion of the head tube member and forms a portion of a front portion of the engine compartment member, wherein the top member extends in a generally rearward direction from the head tube member, wherein the head tube member is connected to the front portion of the engine compartment member, wherein a proximal end of the down tube member is connected to a portion of the head tube member and forms a portion of the front portion of the engine compartment member, and wherein the down tube member extends in a generally rearward direction from the head tube member; wherein the top member is positioned above the down tube member, wherein a front end of the bottom member is connected to a distal end of the down tube member, and wherein the bottom member extends in a generally rearward direction from the distal end of the down tube member.

25. The frame assembly of claim 24, wherein the bottom member has a top surface, the top surface being adapted for mounting the engine thereon.

26. The frame assembly of claim 24, wherein at least a portion of the bottom member is tubular.

27. The frame assembly of claim 24, wherein the engine compartment member further comprises a seat pillar extending between the distal end of the top member and a back end of the bottom member.

28. The frame assembly of claim 27, wherein a distal portion of the top member and a top portion of the seat pillar comprises a seat.

29. The frame assembly of claim 27, wherein the seat pillar extends in a generally upright direction.

30. The frame assembly of claim 27, wherein the structural member further comprises a fender that is connected to a top portion of the seat pillar, wherein the fender extends in a generally rearward direction from the top portion of the seat pillar, and wherein the fender is adapted to cover at least a portion of a rear wheel.

31. The frame assembly of claim 27, wherein the structural member further comprises a fender that is connected to the seat, wherein the fender extends in a generally rearward direction from the seat, and wherein the fender is adapted to cover at least a portion of a rear wheel.

32. The frame assembly of claim 27, wherein the structural member further comprises an arm member that is connected to a portion of the seat pillar, wherein the arm member extends in a generally rearward direction from the seat pillar, wherein a distal end portion of the arm member is adapted to rotatably support a rear wheel, and wherein the engine is configured to drive the rear wheel.

33. The frame assembly of claim 32, wherein the arm member comprises a pair of opposing arm members that are spaced a predetermined distance apart.

34. The frame assembly of claim 32, wherein the arm member is pivotally mounted thereto the portion of the seat pillar.

35. The frame assembly of claim 32, wherein the arm member is connected to a lower portion of the seat pillar.

36. The frame assembly of claim 32, wherein the distal end of the arm member defines a bore, and further comprising a sleeve sized and shaped for disposition therein the bore of the arm member.

37. The frame assembly of claim 32, wherein the arm member defines an opening therein a front portion of the arm member.

38. The frame assembly of claim 24, wherein at least a portion of the contiguous inner surface of the engine compartment member extends peripherally about at least a portion of the engine.

39. The frame assembly of claim 24, wherein the head tube member comprises a tubular head pipe adapted to journal a front wheel for steering movement.

40. The frame assembly of claim 24, wherein the head tube member is positioned at an acute angle relative to an upright axis of the frame assembly.

41. The frame assembly of claim 24, wherein at least a portion of the top member is tubular.

* * * * *